United States Patent [19]

Chrysler

[11] Patent Number: 5,392,805
[45] Date of Patent: Feb. 28, 1995

[54] FROST-RESISTANT HYDRANT

[75] Inventor: Jimmie D. Chrysler, Wyoming, Mich.

[73] Assignee: Amerikam, Inc., Grand Rapids, Mich.

[21] Appl. No.: 98,124

[22] Filed: Jul. 27, 1993

[51] Int. Cl.6 .................. F16K 3/02; F16K 24/02; F16K 35/06
[52] U.S. Cl. .................. 137/218; 137/360; 137/384.2; 137/625.31; 251/288
[58] Field of Search .................. 137/218, 360, 625.31, 137/385, 384.2; 251/288

[56] References Cited

U.S. PATENT DOCUMENTS

| | | | |
|---|---|---|---|
| 536,801 | 4/1895 | Gaghan | 137/360 |
| 657,562 | 9/1900 | Neumeyer | 137/360 |
| 1,047,067 | 12/1912 | Jones . | |
| 1,317,789 | 10/1919 | Hoar | 137/360 |
| 1,937,302 | 11/1933 | Volkhardt . | |
| 2,687,141 | 8/1954 | Baker . | |
| 3,158,170 | 11/1964 | Tubbs . | |
| 3,267,956 | 8/1966 | Kline . | |
| 3,407,837 | 10/1968 | Fulton et al. . | |
| 3,424,189 | 1/1969 | Woodford . | |
| 3,780,758 | 12/1973 | DeVries . | |
| 3,807,455 | 4/1974 | Farrell . | |
| 3,831,621 | 8/1974 | Anthony et al. . | |
| 3,929,150 | 12/1975 | Flinner et al. | 137/218 |
| 3,943,963 | 3/1976 | Papacek . | |
| 3,952,770 | 4/1976 | Botnick . | |
| 4,182,356 | 1/1980 | Woodford, Sr. . | |
| 4,206,777 | 6/1980 | Hirsch et al. | 137/218 |
| 4,209,033 | 6/1980 | Hirsch et al. . | |
| 4,475,570 | 10/1984 | Pike et al. . | |
| 4,644,970 | 2/1987 | Lowry | 137/360 X |
| 4,651,770 | 3/1987 | Denham et al. . | |
| 4,821,762 | 4/1989 | Breneman . | |
| 4,821,765 | 4/1989 | Iqbal et al. . | |
| 4,844,116 | 7/1989 | Buehler et al. | 137/625.31 X |
| 4,909,270 | 3/1990 | Enterante, Sr. . | |
| 4,971,097 | 11/1990 | Hunley, Jr. et al. . | |
| 5,029,603 | 7/1991 | Ackroyd . | |
| 5,129,416 | 7/1992 | Ackroyd . | |
| 5,158,105 | 10/1992 | Conway . | |

Primary Examiner—Gerald A. Michalsky
Attorney, Agent, or Firm—Varnum, Riddering, Schmidt & Howlett

[57] ABSTRACT

A frost-resistant hydrant includes a conduit or body tube connected with a fluid source, a valve, an actuator stem connected with the valve, and a flow-through stem defined by a fluid passage through the valve and the actuator stem. The valve preferably includes a ceramic disk stack rotatable between an open position and a closed position. A combination back-flow preventer and vacuum breaker is positioned in the flow-through stem. The actuator stem has a rotation limit enabling the valve to move between fully open and closed positions within 90 degrees. A cartridge body incorporating the valve includes an anti-rotation key engaging the conduit and fixing the rotational position of the valve cartridge relative to the conduit.

62 Claims, 8 Drawing Sheets

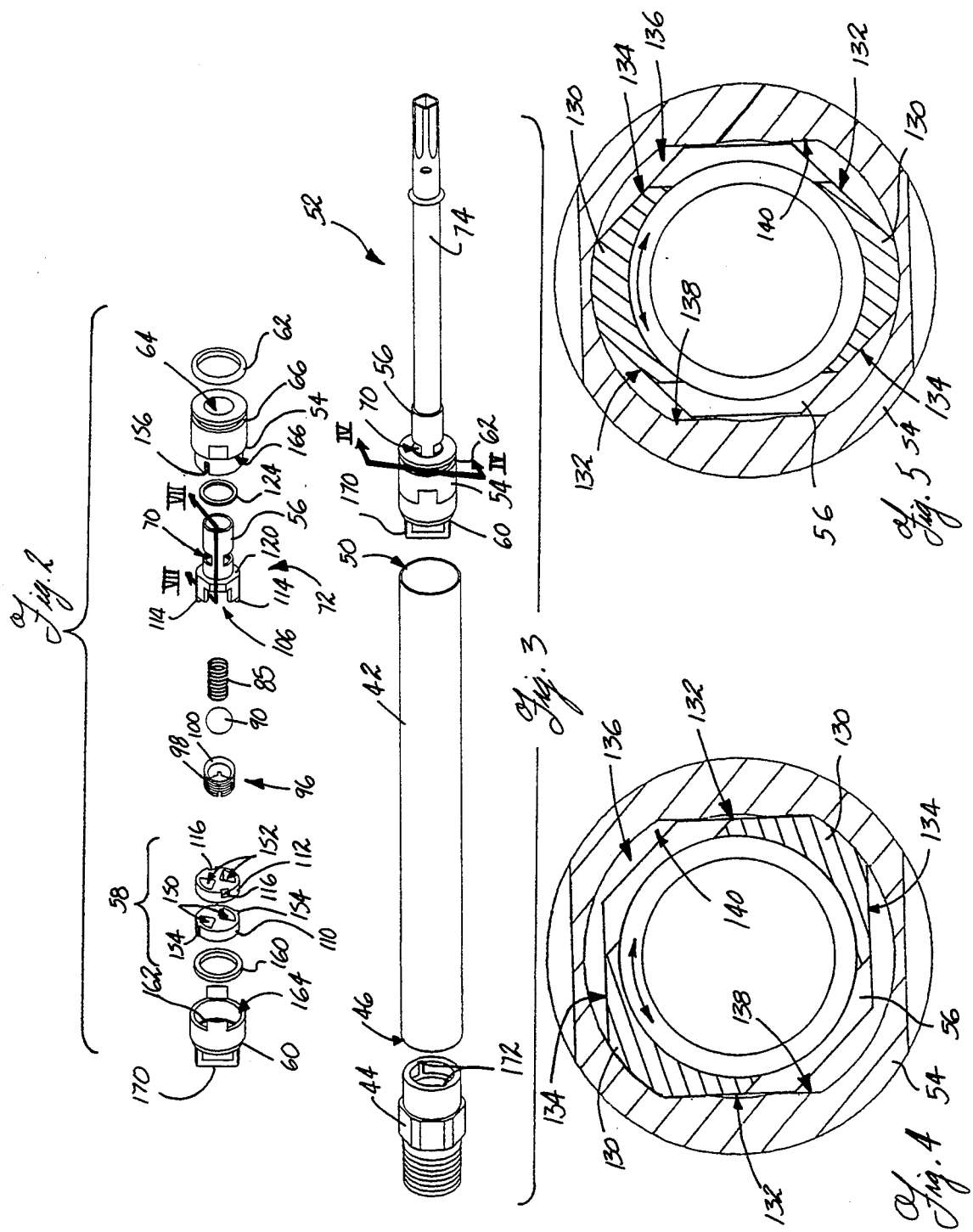

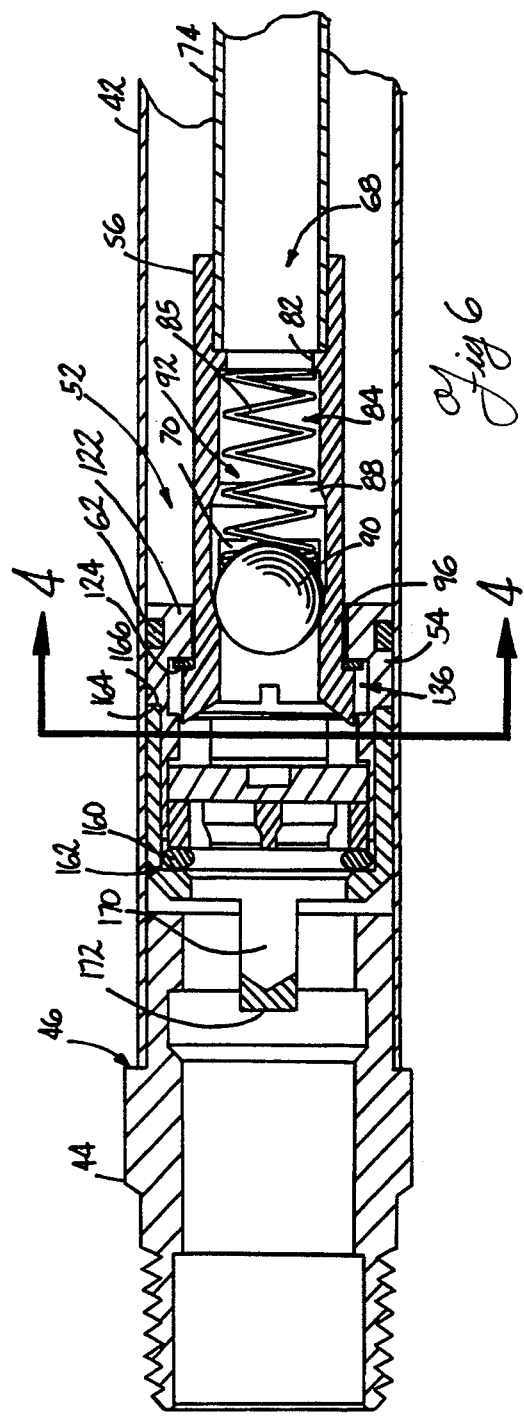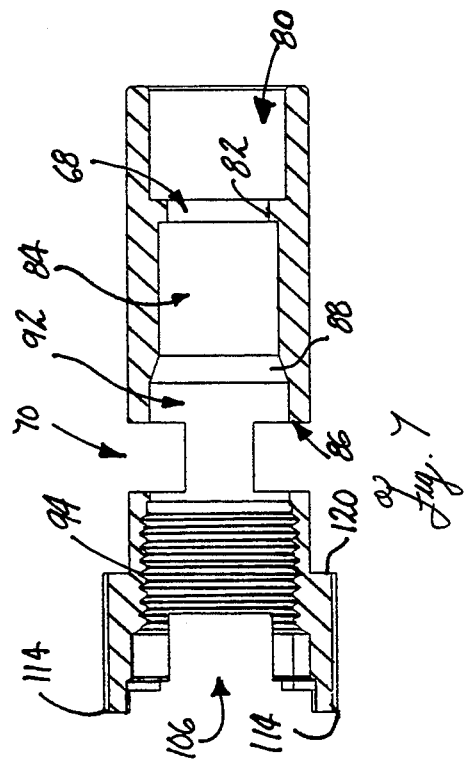

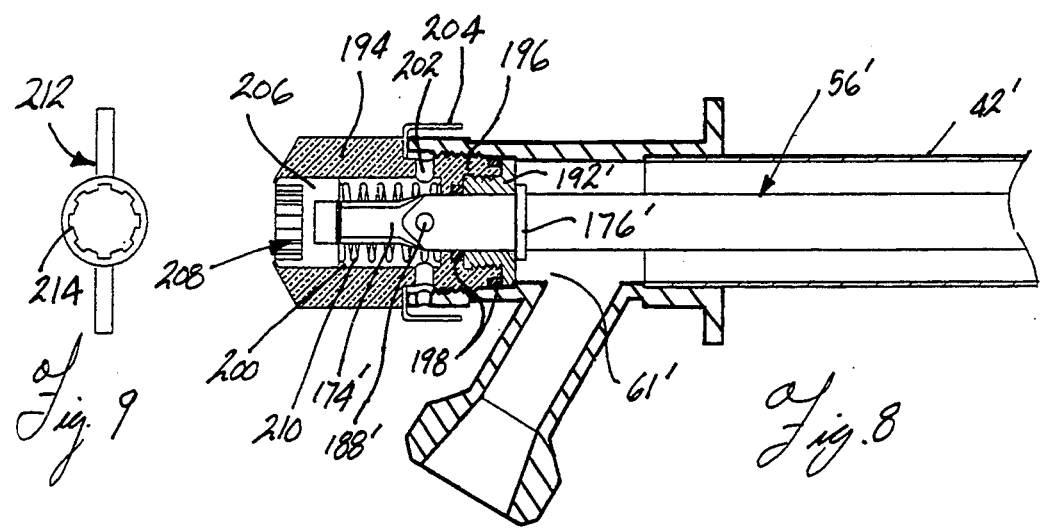
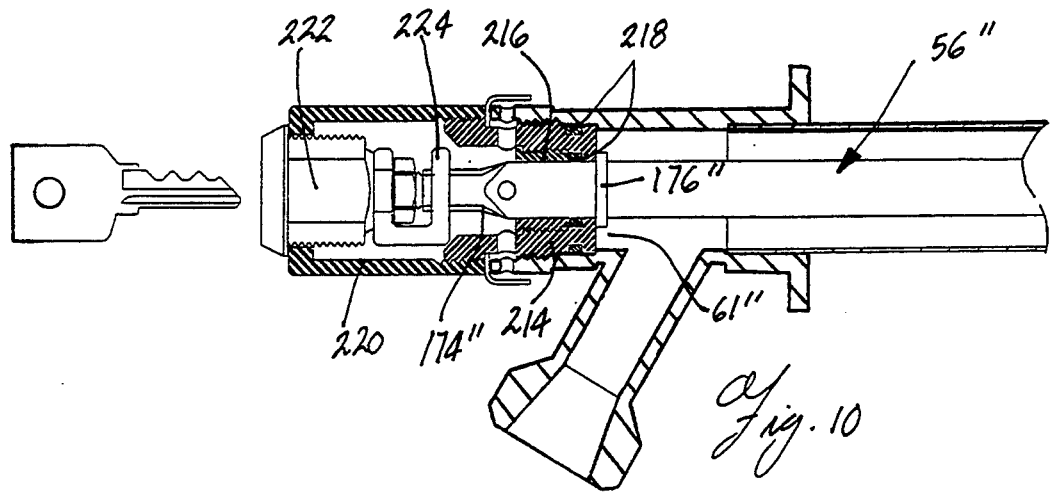

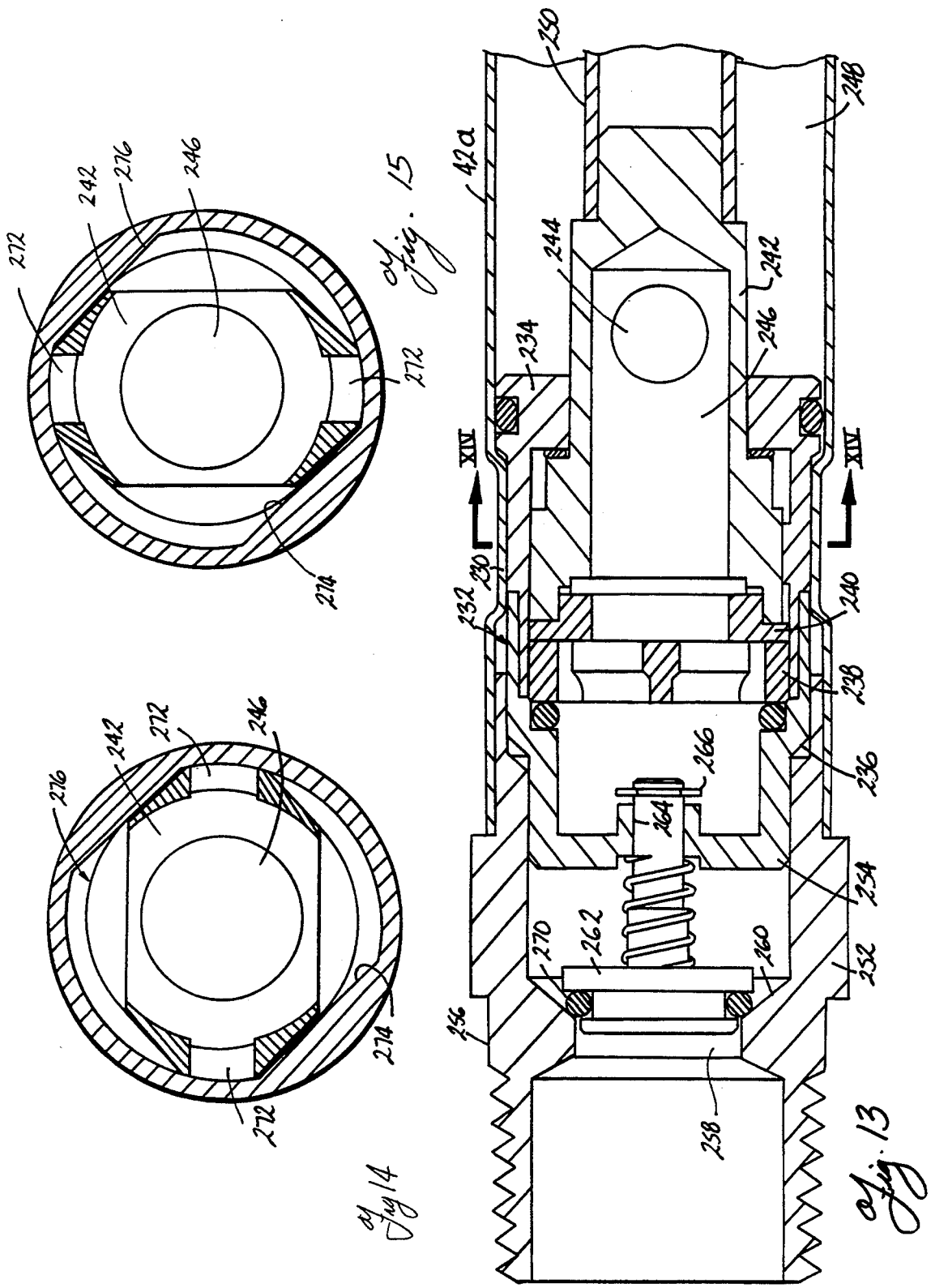

FROST-RESISTANT HYDRANT

BACKGROUND OF THE INVENTION

This invention generally relates to fluid valves and, more particularly, to frost-resistant water supply hydrants.

A frost-resistant sill cock or hydrant typically includes an elongated tubular body with a valve mechanism at a first end and with a spout and a valve operator at a second, opposing end. The elongated body allows the valve mechanism to be positioned in an environment where frost or freezing is not likely to Occur, such as inside a building or underground, while the spout and valve operator are positioned in a frost- or freezing-prone environment, commonly outside a building or otherwise out-of-doors. Typically, the operator is a handle, and an elongated actuator rod or stem extends within the tubular body between the handle and the valve, whereby manipulation of the handle moves the valve between open and closed positions. A predominant valve mechanism is what may be termed a "plunger valve," wherein a valve plunger or stopper is screw-actuated into and out of sealing engagement with a valve seat.

While the plunger valve provides a simple means for controlling flow from a water supply, it does not provide a truly positive control and is prone to damage during closing by over-tightening. That is, rather than screwing the valve plunger into a position of sealing engagement with the valve seat, a user will commonly forcibly close the valve, beyond the point of sealing, mashing and damaging valve seat and plunger sealing surfaces.

Further, plunger valves do not readily lend themselves to adaptation for accommodating contemporary health concerns, specifically back-flow prevention, sometimes known as anti-siphoning. Back-flow preventers or anti-siphon devices are desirable to prevent contamination of the water supply caused by siphoning a contaminant back through the hydrant and into the water supply. Plunger-type valves which incorporate an anti-siphon or back-flow prevention feature are commonly complicated with attendant reduced durability and added expense which often accompany complicated mechanisms. The durability of back-flow prevention and anti-siphon mechanisms may also be compromised by users who over-tighten valves upon closing.

Another feature found in contemporary valves is a vacuum breaker. The vacuum breaker will break the "vacuum" in a hydrant which enables siphoning fluid back through the hydrant to the water supply, thereby offering additional anti-siphon protection. The vacuum breaker also offers structural protection to the hydrant in the case of a careless user who leaves a hose connected to the spout or spigot so that the hydrant does not properly drain, but may freeze and rupture. In this instance, the vacuum breaker releases the "vacuum" which holds water in the hydrant in some circumstances, allowing such residual water to drain from the hydrant. The plunger valve does not readily lend itself to the vacuum breaker function which is commonly accomplished with a separate mechanism.

Thus, one will appreciate the need for a contemporary frost-resistant hydrant providing effective frost-resistance, back-flow prevention or anti-siphon protection, and integrated vacuum breaker protection without the use of conventional plunger valves.

SUMMARY OF THE INVENTION

The deficiencies and problems identified above regarding commonly known frost-resistant sill cocks or hydrants, are squarely addressed by the present invention which provides a hydrant having a conduit for connection with a fluid source, a valve cartridge positioned in the conduit, and a seal between the valve cartridge and the conduit to block fluid from flowing between the valve cartridge and the conduit, directing the fluid through the valve cartridge. The valve cartridge has a cartridge body and a valve mounted in the cartridge body. The valve has an open position allowing fluid flow and a closed position blocking fluid flow. The valve cartridge further has an actuator stem extending from the valve for manipulating the valve between the open and closed positions. The stem extends away from the cartridge body. Also, a fluid passage is defined through the cartridge body, the valve, and the stem.

In one aspect of the invention, an aperture extends through the cartridge body and a bore extends coaxially along the stem to a transverse opening through the stem. The aperture, the bore, and the transverse opening through the stem define the fluid passage through the cartridge body, the valve, and the stem.

In another aspect of the invention, the hydrant includes a check valve to permit fluid flow from the fluid source and to block fluid flow to the fluid source. The check valve may include a single plug seat and a cooperating plug member. Each of the single plug seat and the plug member is adapted to abut in sealing engagement with the other, and the single plug seat is positioned between the plug member and the fluid source. The check valve may also include a biasing member.

In one embodiment of the check valve, the conduit includes a seat adapter which defines the single plug seat. The plug member is connected at an end of the valve cartridge and slides relative to the single plug seat. The plug member is positioned near the single plug seat to abut the same and block fluid back-flow. The plug member also slides to a position spaced from the single plug seat to permit fluid flow from the fluid source.

In a second, alternative embodiment of the check valve, each of the single plug seat and the plug member is positioned in the bore of the stem. The check valve may also include a second plug seat positioned in the bore of the stem and adapted to abut the plug member in sealing engagement. The second plug seat is located on a side of the plug member opposite the first plug seat, and on a side of the transverse opening through the stem opposite the cartridge body. Each of the stem and the bore may extend out of the conduit to connect the bore with atmosphere. The plug member blocks this connection of the bore with atmosphere when the plug member abuts the second plug seat. Further, the plug member may be generally spherically shaped.

A third, alternative embodiment of the check valve is similar to the second, alternative embodiment. The third embodiment has the first plug seat, the plug member, and the second plug seat. However, the plug member in the third embodiment of the check valve includes a slide adapted to abut the second plug seat in sealing engagement. The plug member further includes a seal seat adapted to abut the first plug seat in sealing engagement. Further, the seal seat may define an annular ring with an opening in which the slide is positioned in sliding and sealing engagement with the seal seat.

In another aspect of the invention, the stem rotates relative to the cartridge body. The stem has a rotation limit with an exterior surface including an outwardly protecting lobe. The cartridge body has a cooperating rotation chamber aligned with the rotation limit and includes an inwardly extending stop surface adapted to abut the lobe and limit rotation of the stem to less than about 360 degrees. Farther, the rotation limit may include a pair of opposing outwardly protecting lobes and the rotation chamber may include a pair of inwardly extending stop surfaces to abut the pair of lobes and limit rotation of the stem to about 90 degrees.

In one aspect of the invention, the valve cartridge includes a location key which engages the conduit to prevent rotation of the valve cartridge relative to the conduit. In one embodiment, the conduit is crimped about the rotation key. The rotation key may be a non-cylindrical exterior portion of the cartridge body. In a second, alternative embodiment of the rotation key, the conduit includes a seat adapter with a socket adapted to receive the rotation key. The rotation key may be a tab extending from an end of the valve cartridge and the socket may be a cooperating slot.

In another aspect of the invention, the valve cartridge includes a retainer adapted to couple with the cartridge body at an end of the valve cartridge and the valve is a ceramic disk stack. The valve has a fixed disk positioned in and fixed in rotational position relative to the cartridge body. The valve also has a rotating disk abutting the fixed disk in face-to-face relation. The rotating disk is connected with the stem and the fixed disk is connected with the cartridge body. The valve further has a valve seal between the valve and one of the retainer and the cartridge body. The retainer has an annular surface abutting the valve and a first stop surface abutting a cooperating second stop surface on the cartridge body to positively locate the annular surface relative to the cartridge body.

In yet another aspect of the invention, the stem extends out of the conduit to a terminal end and the hydrant includes an operator connected at the terminal end to actuate the stem and manipulate the valve between the open position and the closed position.

In one aspect of the invention, the conduit has an outer end and the actuator stem has a terminal end near the conduit outer end. The hydrant further includes an operator connected with the stem at the terminal end to actuate the stem and manipulate the valve between the open and closed positions. The operator may be a handle. Alternatively, the operator may include a lock cylinder and a separate key adapted to engage the lock cylinder. In one embodiment of the key and lock cylinder, the lock cylinder defines a socket and the key is adapted to engage the socket. Further, the lock cylinder may engage and disengage the stem so that manipulation of the lock cylinder actuates the stem when the lock cylinder is engaged with the stem and manipulation of the lock cylinder does not affect the stem when the lock cylinder is disengaged from the stem.

These and other features, objects, and benefits of the invention will be recognized by those skilled in the art, from the specification, the claims which follow, and the attached drawings.

BRIEF DESCRIPTION OF THE DRAWINGS

FIG. 2 is an exploded perspective view of a valve cartridge according to the present invention;

FIG. 3 is an exploded perspective view showing a seat adapter, body tube, and assembled valve cartridge with stem extension according to the present invention;

FIG. 4 is a cross-sectional view along section line IV—IV of FIGS. 3 and 6;

FIG. 5 is the view of FIG. 4 showing the stem rotated relative to the valve body;

FIG. 6 is a fragmentary longitudinal section view of an assemblage of the components shown in FIG. 3;

FIG. 7 is a longitudinal section view of the actuator stem along section line VII—VII of FIG. 2;

FIG. 8 is a fragmentary, longitudinal section view of the spout, showing an alternative embodiment of the operator;

FIG. 9 is an end elevational view of one embodiment of a key used with the operator shown in FIG. 8;

FIG. 10 is the view of FIG. 8 showing a third embodiment of the operator;

FIG. 13 is a fragmentary longitudinal section view along section line XIII—XIII of FIG. 11;

FIG. 14 is a cross-sectional view along section line XIV—XIV of FIG. 13;

FIG. 15 is the view of FIG. 14 showing the stem rotated relative to the valve body;

DESCRIPTION OF THE PREFERRED EMBODIMENTS

Figure 1:
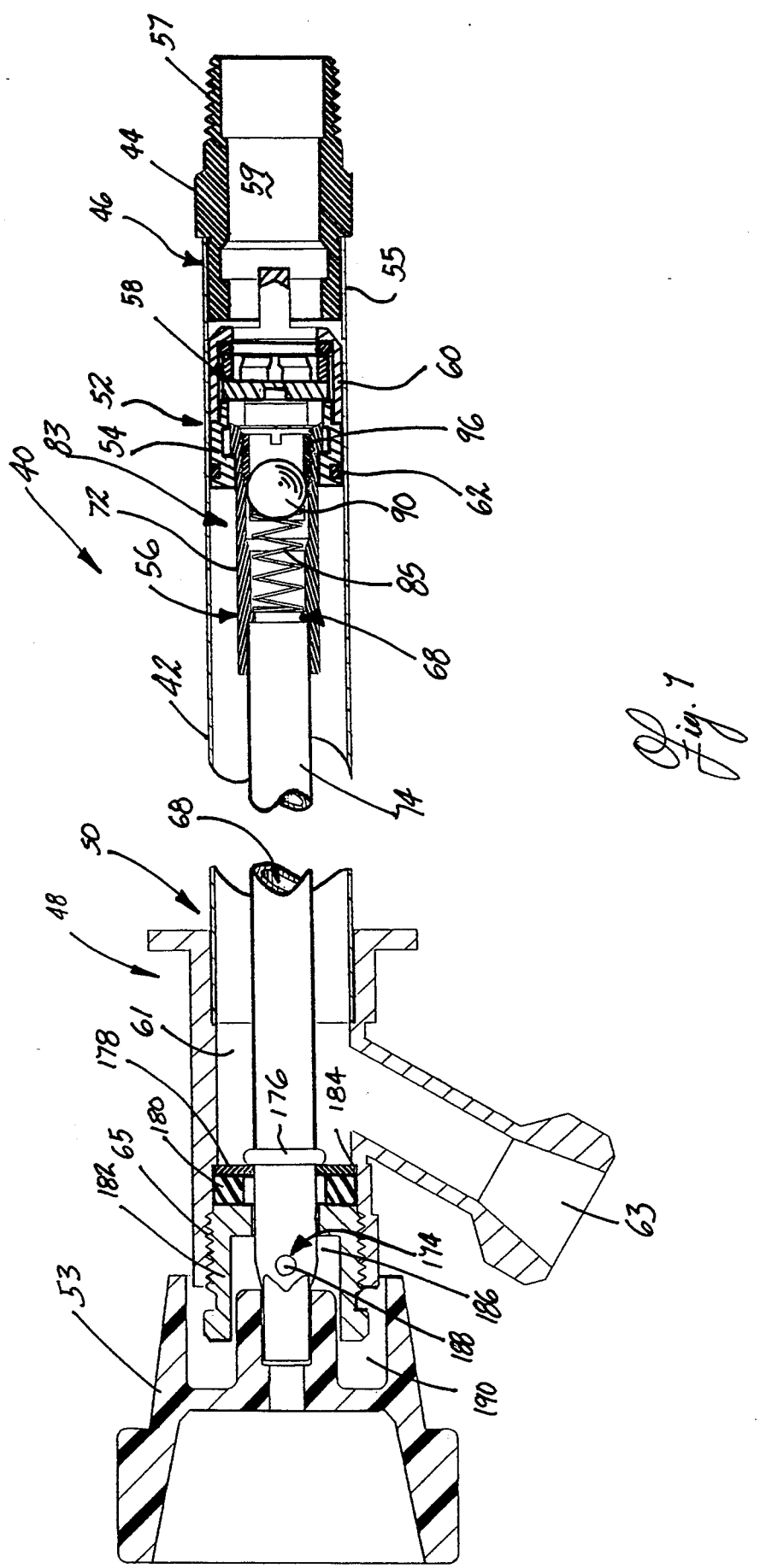
FIG. 1 is a fragmentary longitudinal section view of a frost-resistant hydrant according to the present invention.

Referring to the drawing figures and particularly FIGS. 1 through 7 in greater detail, a frost-resistant hydrant 40 according to the present invention includes a conduit or body tube 42, a seat adapter 44 connected at a first end 46 of body tube 42 for connection with a fluid supply (not shown), such as a water supply pipe, for example, and includes a spout 48 connected at a second end 50 of body tube 42, opposite the first end 46 (FIG. 1). A valve cartridge 52 is slip-fit into position within body tube 42 and is preferably located near the first end 46. Hydrant 40 also includes a handwheel or operator 53 connected with valve cartridge 52 and located at spout 48.

Body tube 42 is preferably a length of three-quarter-inch diameter copper tubing or other tubular material as is commonly known and used for plumbing fixtures. Thus, one end of seat adapter 44 is provided with a cylindrical exterior surface 55 which may be sized for press-fit engagement into conduit end 46, or may be sized for slip-fit engagement and soldering connection with body tube 42 as is commonly known for plumbing components. At a second, opposing end of seat adapter 44, external pipe threads 57 and an internal cylindrical bore 59 are provided for either screw or solder connection with the fluid supply as is commonly known and practiced.

Spout 48 is a commonly available cast bronze or brass member with a cylindrical bore 61 adapted to receive conduit end 50 for press-fit or solder connection. Spout 48 is provided with a conventional hose nipple 63, and internal threads 65 at an end of spout 48 opposite the connection of spout 48 with body tube 42.

Valve cartridge 52 includes a cartridge body 54, an actuator stem 56, a valve 58, a retainer 60, and a cartridge seal 62 (FIGS. 1 through 3 and 6). Cartridge body 54 is most preferably made of brass as is commonly known for plumbing components, but may also be made from any other suitable material, including, but not limited to, plastics and metals other than brass, for example. Cartridge body 54 is generally cylindrical with an aperture 64 extending coaxially therethrough (FIG. 2). As will be described in greater detail below, aperture 64 is also generally cylindrical and includes a portion defining a stem rotation limit chamber and a stem positioning stop or shoulder. A cartridge seal seat 66 is defined by an outwardly opening circumferential groove about the exterior surface of cartridge body 54. Preferably, cartridge seal 62 is an O-ring seal seated in cartridge seal seat 66. Most preferably, seal 62 is a Food and Drug Administration (FDA) approved 70 E.P. O-ring as is commonly known and available.

Actuator stem 56 (FIGS. 1 through 3 and 6) is a generally cylindrical member having a coaxial bore 68 extending therethrough and having at least one transverse opening 70. Actuator stem 56 includes a stem base 72 and a stem extension 74. As with cartridge body 54, above, stem base 72 is also preferably made of brass as is commonly known for plumbing components, but may also be made from any other suitable material. Stem extension 74 may also be made from any suitable material, but is most preferably made from a length of copper tubing. Various methods may be used to couple stem base 72 and stem extension 74, including providing a socket 80 (FIG. 7) in stem base 72 for slip-fit engagement over an end of stem extension 74 and soldering stem base 72 and stem extension 74 together as is commonly known for connecting plumbing components. Alternatively, stem base 72 and stem extension 74 may be formed in one piece.

An annular stop 82 (FIGS. 6 and 7) is formed in stem bore 68 to provide a stop against which stem extension 74 is seated on one side of stop 82 and to provide a bottom for a spring cavity 84 on the other side of stop 82. Spring cavity 84 is provided as a part of a combined vacuum breaker and anti-siphon device 83, located in actuator stem 56. The spring cavity 84 is in open communication with the stem bore 68 extending through stem extension 74. A helical coil spring 85 is positioned in spring cavity 84 and abuts stop 82 (FIGS. 1, 2, 6, and 7). Spring 85 is preferably formed from a FDA-approved noncorrosive material, including, but not limited to, stainless steel, for example, or suitable resilient engineering or structural plastics.

The anti-siphon device 83 also includes a plug seat 88 (FIGS. 6 and 7), located at an end 86 of spring cavity 84 opposite to stop 82 and defined in stem bore 68 by an about 20- to 45-degree bevel. Plug seat 88 is positioned near transverse opening 70, on a side of transverse opening 70 which is away from the fluid supply (not shown) with which seat adapter 44 connects. Plug seat 88 is adapted to abut a cooperating plug 90 in sealing engagement.

Plug 90 is preferably a plastic ball formed from an acetal resin plastic such as is marketed by the E. I. du Pont de Nemours & Co. under the trademark DELRIN TM, or the like. While plug 90 cooperatingly abuts plug seat 88 in sealing engagement, plug 90 is also sized to move freely in a plug chamber 92, defined in stem bore 68 (FIGS. 6 and 7). Further, plug 90 is adapted to abut an end of spring 85. Spring 85 is interposed between plug 90 and stop 82 to bias plug 90 away from seat 88.

Also defined in stem bore 68 and located near transverse opening 70, opposite plug seat 88, are internal screw threads 94 (FIG. 7). Threads 94 are adapted to receive a plug seat 96 of the back-flow prevention device 83 (FIGS. 1, 2, and 6). Plug seat 96 is a tubular member having cooperating external threads 98 to mate with threads 94 and having an internal chamfer or bevel of about 20 to 45 degrees to form a sealing surface 100 adapted to seal with plug 90. Plug seat 96 may be made of brass, like cartridge body 54 and stem base 72, above, and may also be made from any other suitable material, including DELRIN TM, for example.

Plug 90 is biased by spring 85 into sealing engagement with seat 96 at the sealing surface 100 to effect the back-flow prevention function (FIGS. 1 and 6). Various regulatory authorities dictate minimal requirements for the performance of back-flow preventers. Thus, spring 85 is designed to meet such requirements with a compressive spring force sufficient to keep plug 90 sealed with seat 96 against a water supply pressure of about three pounds per square inch, or as is otherwise specified by controlling regulation.

An end 106 (FIG. 7) of stem base 72, opposite stem extension 74 is adapted to engage valve 58 (FIG. 2). Valve 58 is preferably a ceramic disk valve, including a ceramic disk stack with a fixed ceramic disk 110 and a rotating ceramic disk 112 which abut one another in face-to-face relation as disclosed in greater detail below. Thus, stem end 106 is specifically adapted to engage rotating ceramic disk 112, and most preferably, defines a pair of diametrically opposing tabs 114. Tabs 114 are sized and shaped to couple in sliding engagement with cooperating notches 1.16 defined in rotating ceramic disk 112.

Actuator stem 56 is received in sliding engagement in aperture 64 of cartridge body 54 (FIGS. 1, 2, and 6). To position actuator stem 56 in cartridge body 54, an annular shoulder 120 is defined on the exterior surface of stem base 72, between transverse opening 70 and end 106, and a cooperating annular stop 122 (FIG. 6) is defined in cartridge body aperture 64. Shoulder 120 and stop 122 abut one another in sliding engagement to position stem 56 in cartridge body 54 and so stem 56 rotates relative to cartridge body 54. Preferably, a washer 124 (FIGS. 2 and 6) is interposed between shoulder 120 and stop 122 to minimize wear and promote durability. Washer 124 may be of any suitable material, including, but not limited to, an acetal resin plastic such as DELRIN ™, described above.

Each of cartridge body 54 and actuator stem 56 is adapted for cooperating engagement to provide valve cartridge 52 with a rotation limit (FIGS. 4 and 5). The rotation limit includes outwardly projecting lobes 130 with stop surfaces 132 and 134 defined on the exterior of stem base 72 and includes a cooperating rotation chamber 136 defined in cartridge body aperture 64 to align with lobes 130. Rotation chamber 136 is defined by stop surfaces 138 and 140. The rotation chamber stop surfaces 138, 140 are adapted to abut the rotation limit lobe surfaces 132 and limit rotation of actuator stem 56 relative to cartridge body 54 when stem 56 is rotated in a first direction to a first extreme position, one of the valve open or closed positions (FIG. 4). The rotation chamber surfaces 138, 140 are adapted to abut the rotation limit lobe surfaces 134 and limit rotation of actuator stem 56 relative to cartridge body 54 when stem 56 is rotated in a second direction to a second extreme position, the other of the valve open or closed positions. Rotation of actuator stem 56 may, thus, be limited to about 90 degrees of rotation.

However, each of lobes 130 and chamber surfaces 138 and 140 may be modified to extend or reduce the degree of rotation of stem 56 relative to cartridge body 54. Thus, those who practice the invention will realize, for example, that one of lobes 130 and one of stop surfaces 138 or 140 may be eliminated while the remaining lobe and stop surface may be reconfigured so stem 56 may rotate up to about 360 degrees relative to cartridge body 54. Further, while the rotation limit, including lobes 130 and rotation chamber 136, is specifically depicted in the preferred embodiment as being inside cartridge body 54, it will also occur to those who practice this invention that the rotation limit and the rotation chamber may also be located outside of cartridge body 54.

Valve 58 (FIGS. 1, 2, and 6) is preferably a ceramic disk valve, including a ceramic disk stack with a fixed ceramic disk 110 and a rotating ceramic disk 112 which abut one another in face-to-face relation as disclosed in greater detail in commonly assigned U.S. Pat. No. 5,174,324, entitled CERAMIC VALVE and issued on Dec. 29, 1992, to Chrysler, the disclosure of which is incorporated here by reference. Each of fixed disk 110 and rotating disk 112 is provided with a pair of apertures 150, 152, respectively (FIG. 2). The apertures 150, 152 align when rotating disk 112 is rotated in a first direction to an open position relative to fixed disk 110. Apertures 152 move out of alignment with apertures 150 and become blocked by fixed disk 110 while apertures 150 become blocked by rotating disk 112 when rotating disk 112 is rotated in a second, opposite direction to a closed position relative to fixed disk 110.

As mentioned above, rotating disk 112 is keyed to actuator stem 56 by notches 116 (FIG. 2) which receive tabs 114 provided on actuator stem. The interconnection of rotating disk 112 with stem 56 also holds rotating disk 112 securely in axial position while providing controlled rotation of rotating disk 112. Conversely, fixed disk 110 is keyed to cartridge body 54. More particularly, fixed disk 110 is provided with a pair of diametrically opposed tabs 154 adapted for sliding engagement with a pair of cooperating slots 156 provided in cartridge body 54. Tabs 154 and slots 156 are sized to hold fixed disk 110 securely in a rotational direction and to allow some tolerance or movement in an axial direction to accommodate pre-loading of the disk stack, discussed further below. Of course, rotating disk 112 may be keyed to stem 56 and fixed disk 110 may be keyed to cartridge body 54 by other, equivalent methods as will occur to those who practice the invention.

A valve seal 160 (FIGS. 2 and 6) is included with valve 58 to preclude fluid flow around valve 58 and direct fluid flow through disk apertures 150 and 152 of valve 58. Valve seal 160 may be located between one of fixed disk 110 and rotating disk 112 of valve 58 and one of cartridge body 54 and retainer 60. Valve seal 160 is most preferably a lathe-cut, FDA-approved 50 E. P. O-ring interposed between fixed disk 110 and retainer 60.

Retainer 60, like cartridge body 54, is also preferably a brass member, and is force-fit over an end of cartridge body 54 to contain and position actuator stem 56 and valve 58 in cartridge body 54 (FIGS. 2, 3, and 6). Retainer 60 has an annular surface 162 for abutting valve 58. More specifically, surface 162 preferably abuts valve seal 160, as shown in FIG. 6. Retainer 60 also has a stop surface 164 and cartridge body 54 has a cooperating stop surface 166 (FIGS. 2 and 6). Stop surface 166 on cartridge body 54 is specifically located relative to cartridge body 54 and stop surface 164 on retainer 60 is specifically located relative to annular surface 162 so the stop surfaces 164, 166 abut one another to positively locate annular surface 162 relative to cartridge body 54. More particularly, annular surface 162 is positioned relative to cartridge body 54 to provide a desired compressive pre-loading force to valve seal 160 while abutting engagement of retainer stop surface 164 with cartridge body stop surface 166 precludes further compression of valve seal 160. The desired pre-loading of valve seal 160 is selected to properly seal valve seal 160 and to properly press fixed disk 110 and rotating disk 112 together without crushing either of the disks 110, 112 or deforming valve seal 160. It will be understood by those skilled in the art that retainer 60 can be press-fit or otherwise secured to the cartridge body 54 as by ultrasonic welding.

Valve cartridge 52 is also provided with an anti-rotation key to preclude rotation of valve cartridge 52 relative to body tube 42 with manipulation or rotation of actuator stem 56. Thus, a portion of valve cartridge 52 is provided with a non-cylindrical exterior portion which preferably defines a tab 170 (FIGS. 2, 3, and 6). Seat adapter 44 is provided with a cooperating slot 172 (FIGS. 3 and 6) adapted to receive tab 170 in sliding engagement. In addition to functioning as an anti-rotation key, tab 170 also provides a safety feature to avoid damage during assembly of hydrant 40.

Referring again to FIG. 1, hydrant 40 also includes an operator or handle 53 connected at a terminal end 174 of actuator stem 56 for manipulation by a user to open and close valve 58. A flange 176 at terminal end 174 cooperates with a washer 178, packing gland 180, and a nut 182 to secure valve cartridge 52 in body tube 42. Nut 182 has external threads which interengage with the internal threads 65 in the spout bore 61 to tighten the packing gland 180 and washer 178 against an annular shoulder 184 in the spout bore 61. The nut 182 has a countersunk well 186 so that the terminal end 174 of the actuator stem 56 is exterior to the spout 48. An aperture 188 at the terminal end 174 establishes communication between the stem coaxial bore 68 and atmosphere. The operator or handle 53 is secured to the terminal end 174 by conventional means such as a bolt or screw, and is configured to have a channel 190 cooperating with the countersunk well 186 to maintain open communication between the stem coaxial bore 68 and atmosphere.

It will be apparent that when the nut 182 is tightened within the spout bore 61 and against the flange 176 on the actuator stem 56, the tab 170 on the retainer is received in cooperating slot 172 of the seat adapter 44. Thus, the valve cartridge 52 is securely held against axial movement within the body tube 42 as well as held against rotational movement.

Turning now to FIGS. 8 through 10, alternative operators are disclosed for those applications where access to the water supply is to be strictly controlled. In this and following embodiments, like parts are numbered alike for ready cross-reference among the embodiments. In FIG. 8, a stepped washer 192 bears against a flange 176' of the actuator stem 52' to secure the valve cartridge (not shown) within the body tube 42'. An adapter nut 194 has a threaded end 196 which is threaded into the spout bore 61' to secure the washer 192. O-rings 198 are provided to seal the spout bore 61'. The terminal end 174' of the actuator stem 52' extends into a chamber 200 within the adapter nut 194. Radial channels 202 in the adapter nut 194 establish communication between the chamber 200 and atmosphere. A collar 204 with a rearwardly directed flange is adapted to direct any fluid flow coming through the radial channels 202 away from the operator. A traveler 206 having a key receptacle 208 is slidably disposed within the chamber 200 and biased away from connection with the terminal end 174' by a spring 210. A key 212 (see FIG. 9) having a keying surface 214 complementary to the key receptacle 208 in the traveler 206 is adapted to engage the traveler 206 and urge it into connection with the terminal end 174' of the actuator stem 52', thereby enabling actuation of the valve by rotation of the actuator stem 52'.

In FIG. 10, an adapter nut 214 is secured within the spout bore 61" and directly against the flange 176" of the actuator stem 52". A locking nut 216 threaded into internal threads on the adapter nut secures the adapter nut within the spout bore 61", and O-rings 218 are provided to seal the structure. A cap nut 220 carrying a plunger lock 222 is threaded onto the end of the adapter nut to enclose the terminal end 174" of the actuator stem 52". A crank arm 224 extends from the plunger lock 222 to connect with the terminal end 174". By inserting a key 226 into the plunger lock 222, and rotating it, the crank arm 224 is cooperatively rotated, thereby also rotating the actuator stem 52".

The valve of the present invention is so easy to operate, especially with the minimal rotation required between the open and closed positions, that it will be obvious to incorporate further alternative operators. For example, a mechanical push button can be operatively connected to a mechanism for rotating the actuator stem. Also, an electric solenoid can be operatively connected to the stem to cause rotation upon energizing the solenoid.

Figure 11:
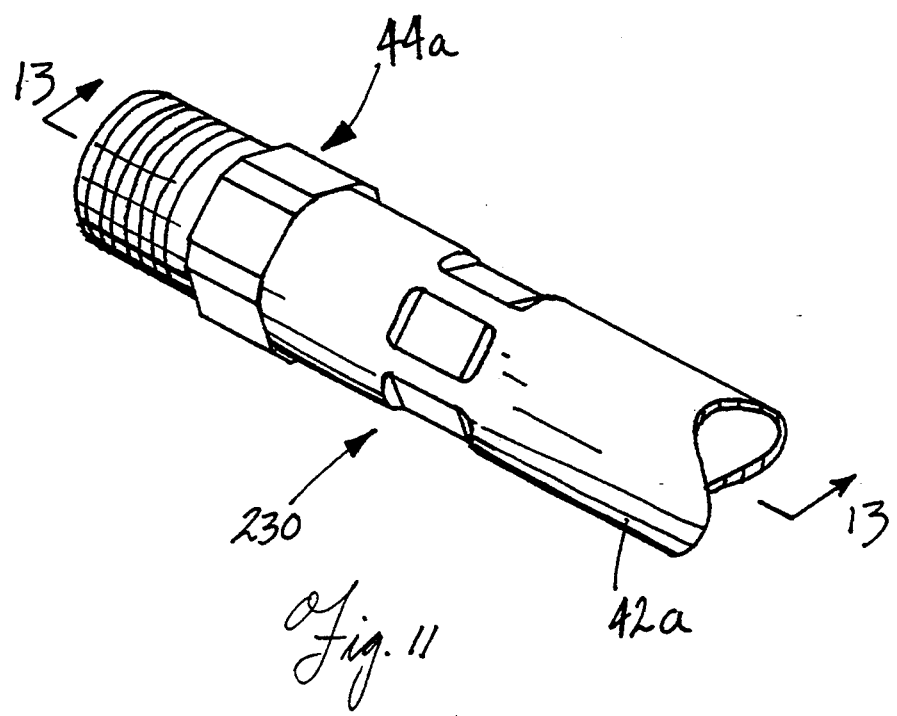
FIG. 11 is a fragmentary exterior perspective view of a first alternative embodiment of a hydrant according to the present invention.
Figure 12:
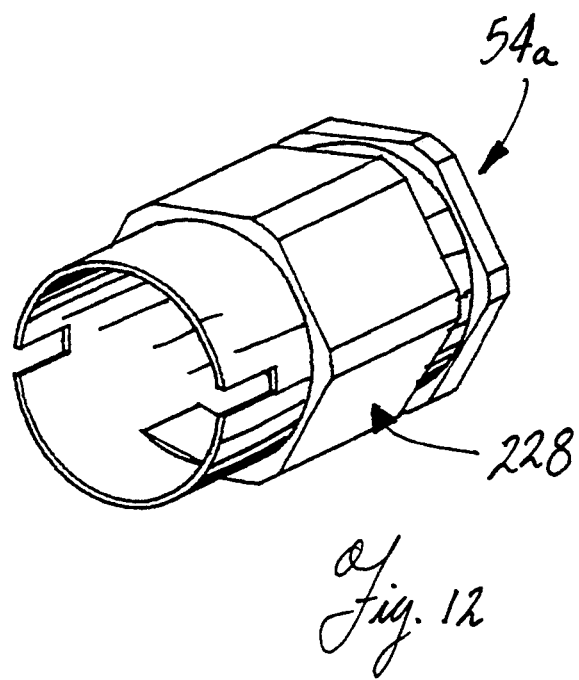
FIG. 12 is a perspective view of a valve body of the hydrant of FIG. 11.
Figure 16:
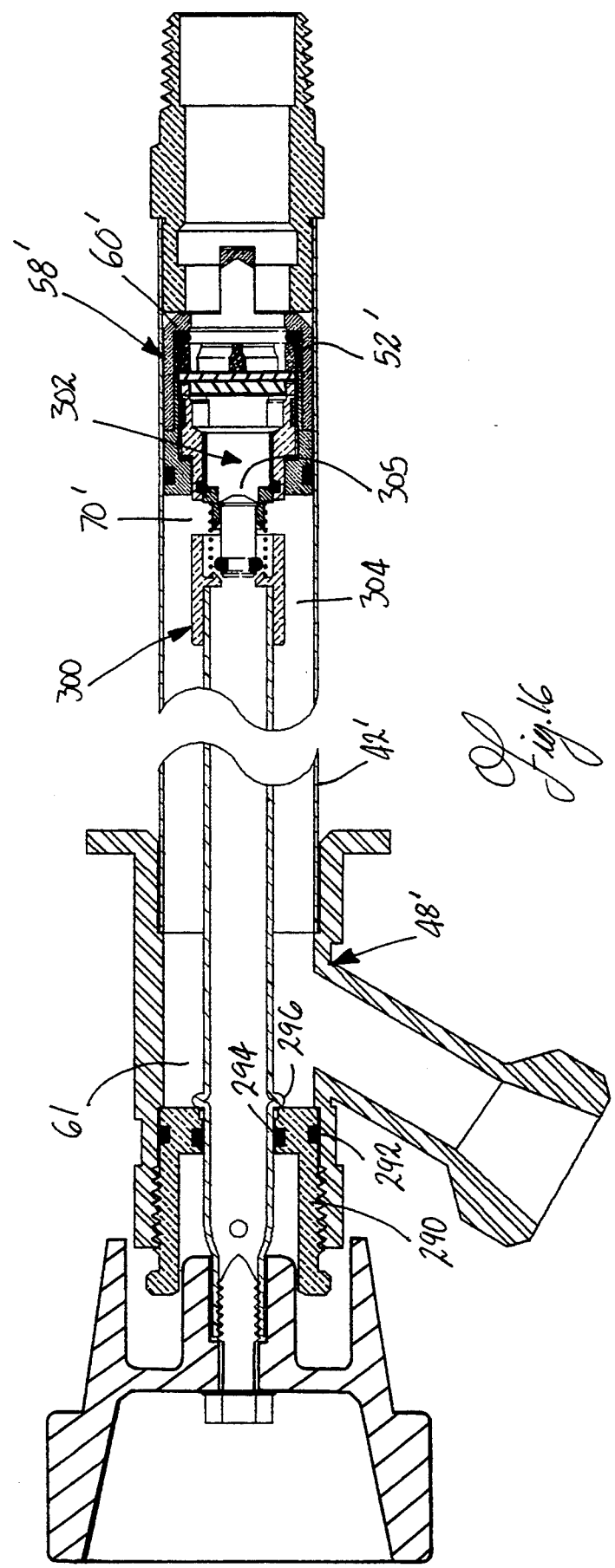
FIG. 16 is a fragmentary, longitudinal section view of a second alternative embodiment of a hydrant according to the invention.

Turning now to FIGS. 11 and 12, an alternative anti-rotation key is disclosed wherein the valve cartridge is prevented from rotating within the body tube as the actuator stem is rotated. The alternative anti-rotation key comprises a keying surface 228 on the valve cartridge 52a (see FIG. 12) and a cooperating key receptacle 230 in the seat adapter 44a or, as illustrated in FIG. 11, the body tube 42a. Generally, a non-cylindrical surface 228 is adapted to be received in a complementary-shaped non-cylindrical receptacle 230. In the illustrated embodiment, the valve cartridge 52a has a generally hexagonal exterior surface which is received in a hexagonal crimp 230 in the body tube, thereby inhibiting rotation of the valve cartridge 52 as the actuator stem 56 is rotated. In assembly, the non-cylindrical receptacle 230 can be preformed, or alternatively, it can be formed, as by crimping, around the surface 228 after insertion of the valve cartridge 52a into the body tube 42a.

Turning now to FIGS. 13 through 15, a second embodiment of a valve cartridge is shown with an alternative, plunger-type back-flow preventer or anti-siphon device. In FIG. 13, a valve cartridge 232 comprises a cartridge body 234 and a retainer 236, including a ceramic disk stack with a fixed ceramic disk 238 and a rotating ceramic disk 240, cooperatively engaged as disclosed in U.S. Pat. No. 5,174,324 to Chrysler and as disclosed above in the first embodiment. A flow-through rotation stem 242 interengages with the rotating disk 240 and has one or more apertures 244 which establish communication between an interior channel 246 and a waterway 248 in the body tube 42a. As disclosed in FIGS. 11 and 12, a crimped portion 230 of the body tube 42a cooperates with a complementary surface of the cartridge body 234 to prevent rotation of the valve cartridge 232. A drive tube 250 extends from the rotation stem 242 to connect to an operator handle (not shown). It will be apparent that the interior of the drive tube and the rotation stem is not in communication with the atmosphere, there being no vacuum breaker assembly illustrated in FIG. 13. In this embodiment, a conventional add-on vacuum breaker can be used, as commonly known in the art.

A seat adapter 252 is secured to the end of the body tube 42a and receives a projecting arm 254 of the retainer 236. An annular rib 256 on an interior surface of the seat adapter 252 defines an inlet channel 258 and a beveled valve seat 260. A valve plunger 262 is slidably disposed within an aperture 264 on the projecting arm 254 and retained therein by a retaining ring 266. A spring 268 biases the plunger 262 and a sealing O-ring 270 carried by the plunger into sealing engagement with the valve seat 260.

Looking now at FIGS. 14 and 15, it can be seen that outwardly projecting lobes 272 on the rotation stem 242 cooperate with stop surfaces 274, 276 in the cartridge body 234 to effectively limit rotation of the stem within the cartridge body to approximately 90 degrees. It will be understood that within this 90-degree rotation limit, the valve will move from a completely closed position to a completely open position as discussed above. In the open position, water is permitted to flow through the inlet channel 258 forcing the anti-siphon plunger 262 to a retracted position, through the ceramic disk stack, the interior channel 246 of the rotation stem 242, through the aperture 244 into the waterway 248 and thereby move to the spout (not shown). In a situation where a vacuum is drawn in the inlet spout 258, the anti-siphon plunger 262 is drawn into sealing engagement with the valve seat 260 to thereby prevent contaminants from following the reverse fluid flow into the inlet channel 258 from the waterway 248.

A third embodiment of a valve cartridge with an alternative back-flow preventer and vacuum breaker is shown in FIGS. 16 through 20. In the third embodiment, the valve 58', including valve cartridge 52' and the retainer 60' are substantially identical to the embodiment disclosed in FIG. 6 and discussed above. An actuator stem 300 operatively connects to the rotating disk of the valve 58' to open and close the valve within a 90-degree rotation as discussed above. A transverse opening 70' in the actuator stem 300 establishes communication between an interior chamber 302 and a waterway 304 within the body tube 42'.

The third embodiment discloses an alternate means for securing and sealing the valve 58' within the body tube 42'. A nut 290 (also sometimes known as a stuffing box) has external threads which engage internal threads in the spout bore 61' of the spout 48'. The nut 290 also has an external annular groove which receives an O-ring seal 292, and an internal annular groove which receives an O-ring seal 294. The nut 290 is received over the terminal end of the actuator stem 300 and bears against a flange 296 to retain the valve 58' within the body tube 42'. The O-ring 292 seals against the interior surface of the spout bore 61', and the O-ring 294 seals against the exterior surface of the actuator stem 300.

The interior chamber 302 includes a back-flow port 305 defined by an annular groove 306 on the interior surface of the actuator stem 300 between the transverse opening 70 and the valve 58' and an O-ring 308 received therein. A sleeve 310, preferably formed of nylon, extends between the O-ring 308 and the end of the actuator stem 300 adjacent to the valve 58'. One function of the sleeve 310 is to reduce turbulence in the fluid flow at the O-ring 308.

An annular stop 82' is disposed in the actuator stem 300 at one end of interior chamber 302 away from the cartridge body 54' and defines a vacuum breaker valve seat 312 at a vacuum breaker port 314. The vacuum breaker port 314 permits communication between the interior chamber 302 and the stem coaxial bore 68'.

Figure 17:
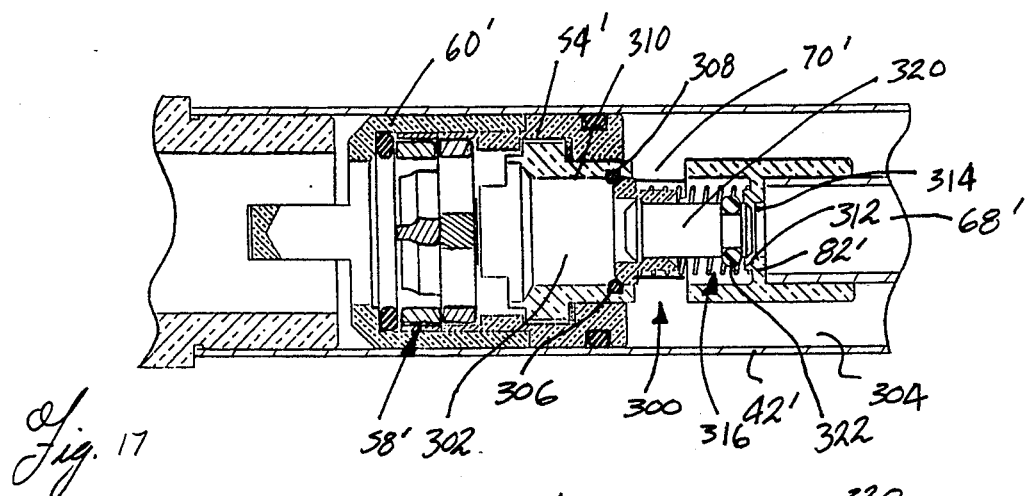
FIG. 17 is a view similar to FIG. 6 showing the second alternative embodiment of FIG. 16 with fluid flow closed, the vacuum breaker open, and the back-flow preventer closed.

A check valve 316, disposed within the chamber 302 between the O-ring 308 and the vacuum breaker valve seat 312 comprises an anti-siphon seal disk 318 and a plunger 320. The seal disk 318 is adapted to close the back-flow port 305, and the plunger 320 is adapted to close the vacuum breaker port 314. The plunger 320 slidably reciprocates in a coaxial bore extending through the seal disk 318, and has an O-ring 322 disposed in an annular groove at the end thereof extending toward the vacuum breaker valve seat 312. The seal disk 318 is biased toward sealing engagement with the O-ring 308 by a spring 324 extending between the seal disk and the annular stop 82'. The O-ring 322 on the end of the plunger 320 is adapted to be in sealing engagement with the vacuum breaker valve seat 312. A head 326 on the plunger is spaced away from the O-ring 322 and is received in a recessed seat 328 in the seal disk 318. The plunger 320 is axially dimensioned so that when the seal disk 318 is in sealing engagement with the O-ring 308, the O-ring 322 on the end of the plunger will be drawn away from the vacuum breaker valve seat 312 by the interengagement of the head 326 with the recessed seat 328, as illustrated in FIG. 17. In this state of normal operation, the valve 58' is closed, and the waterway 304 is in communication with the stem coaxial bore 68' via the transverse opening 70' and the vacuum breaker port 304. In other words, vacuum in the hydrant is broken, and any residual water in the hydrant can exit through the spout 48'.

Figure 18:
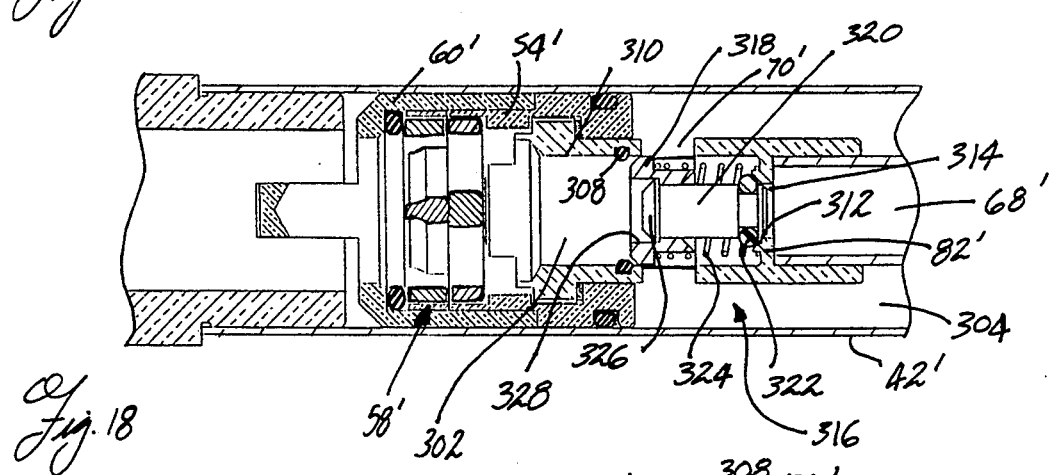
FIG. 18 is the view of FIG. 17 with positive fluid flow starting, the vacuum breaker closed, and the back-flow preventer opening.
Figure 19:
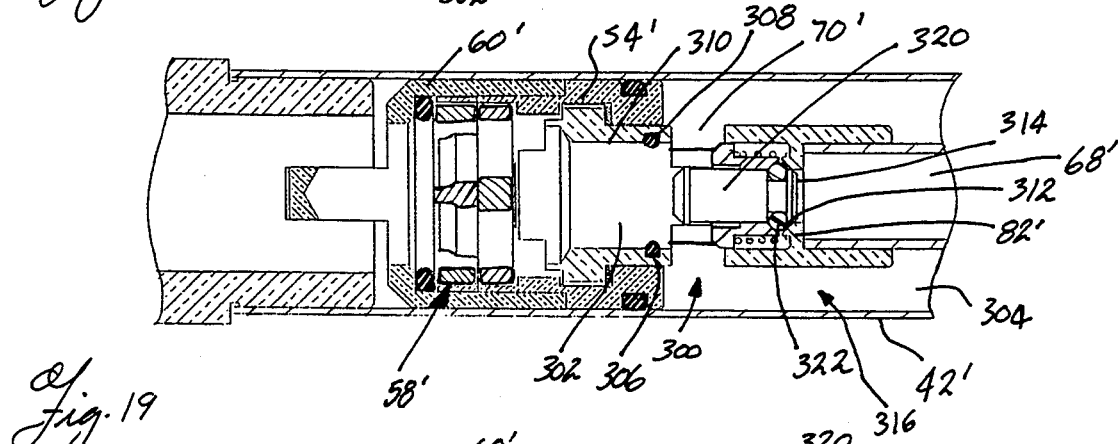
FIG. 19 is the view of FIG. 17 with positive fluid flow open, the vacuum breaker closed, and the back-flow preventer open.
Figure 20:
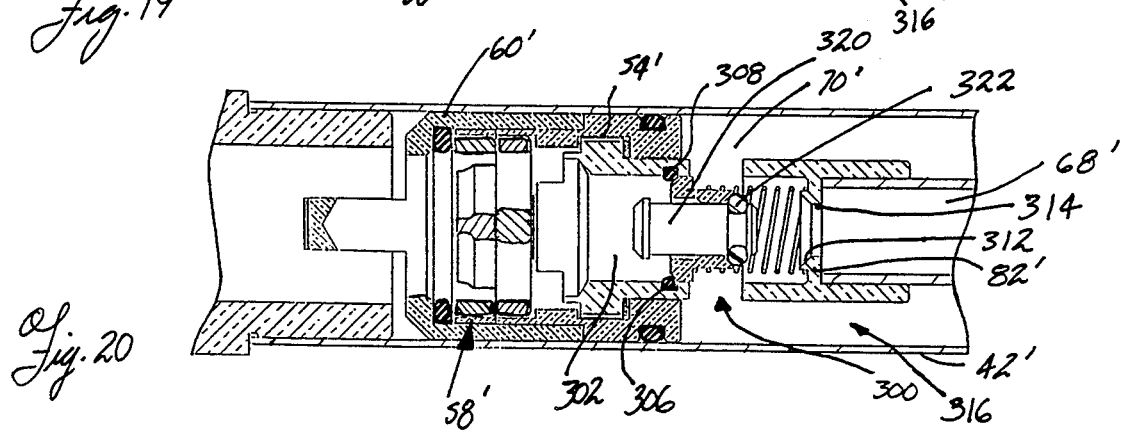
FIG. 20 is the view of FIG. 17 in a back-flow condition with fluid flow open, the back-flow preventer closed, and the vacuum breaker open.

FIG. 18 illustrates the structure at the beginning of fluid flow such as when the valve is cracked open as a user begins to rotate the handle. Fluid, under pressure, begins to fill the interior chamber 302 and quickly pushes the plunger 320 into sealing engagement with the vacuum breaker valve seat 312, thereby closing communication between the stem coaxial bore 68' and the waterway 304. It will be apparent that this sealing action occurs before fluid flow enters the waterway 304. Increasing pressure in the interior chamber 302 urges the seal disk 318 against the bias of spring 324 away from the O-ring and establishes fluid communication between the chamber 302 and the waterway 304 as illustrated in FIG. 19. At full flow, as in FIG. 19, the seal disk 318 is urged all the way to the end of the plunger 320, reinforcing the plunger's sealing engagement with the vacuum breaker valve seat 312. FIG. 20 illustrates the opposite condition where water pressure is removed, and a vacuum is drawn at the inlet such as in a siphon condition. The seal disk 318 is securely seated against the O-ring 308, and the plunger 320 is drawn away from the vacuum breaker valve seat 312 to a point where the O-ring 322 is in sealing engagement with the seal disk 318, thereby preventing fluid flow from the waterway 304 into the interior chamber 302, while at the same time opening communication between the stem coaxial bore 68' and the waterway 304 to break vacuum in the hydrant.

It will be apparent that the plunger 320 seals the vacuum breaker port 314 before the seal disk 318 permits flow through the back-flow port 305. Thus, a surprising benefit of the structure illustrated in FIGS. 16 through 20 is that the hydrant will not leak from the vacuum port, even at very low pressures, as typically occurs in prior art hydrants.

It will be understood by one skilled in the art that various modifications and improvements may be made without departing from the spirit of the disclosed concept. The scope of protection afforded is to be determined by the following claims and by the breadth of interpretation allowed by law.

The embodiments of the invention in which an exclusive property or privilege is claimed are defined as follows.

1. A hydrant comprising:
a conduit adapted to communicate with a fluid source;
a valve cartridge positioned in the conduit, the valve cartridge including a cartridge body having first and second opposite open ends, a ceramic disk valve mounted in the cartridge body, the valve being movable between an open position allowing fluid flow axially through the valve in a first direction from the second open end through the first open end and a closed position blocking fluid flow, a hollow actuator stem connected with the valve for manipulating the valve between the open position and the closed position, the stem extending away from the cartridge body, and in fluid communication with the first open end of the cartridge body and the conduit thereby defining a fluid passage through the cartridge body, the valve, the stem and the conduit; and
a seal in the fluid passage between the valve cartridge and the conduit to block the fluid from flowing between the valve cartridge and the conduit in a direction opposite the first direction.

2. The hydrant defined in claim 1 wherein a transverse opening extends from the interior of the stem to the exterior of the stem, the transverse opening being located outside of the cartridge body, and wherein the aperture, the stem interior, and the transverse opening at least partially define the fluid passage.

3. The hydrant defined in claim 2 further including a check valve operatively connected with the cartridge body to permit fluid flow from the fluid source and comprising the seal to block fluid flow in a reverse direction toward the fluid source.

4. The hydrant defined in claim 3 wherein the check valve includes one plug seat and a cooperating plug member, the one plug seat and the plug member being adapted to abut in sealing engagement with one another, the one plug seat being positioned between the plug member and the fluid source.

5. The hydrant defined in claim 4 wherein the conduit includes a seat adapter and the seat adapter defines the one plug seat.

6. The hydrant defined in claim 5 wherein the plug member is operatively connected at a first cartridge end, in sliding engagement relative to the one plug seat and in proximity to the one plug seat to abut the one plug seat in sealing engagement blocking fluid flow in the reverse direction and to slide to a position spaced from the one plug seat permitting fluid flow from the fluid source.

7. The hydrant defined in claim 6 wherein the check valve further includes a biasing member biasing the plug member toward the one plug seat.

8. The hydrant defined in claim 4 wherein each of the one plug seat and the plug member is positioned in the coaxial bore of the stem.

9. The hydrant defined in claim 8 wherein the check valve further includes a second plug seat, adapted to abut in sealing engagement with the plug member and positioned in the bore of the stem, on a side of the plug member opposite the one plug seat, and on a side of the transverse opening opposite the cartridge body.

10. The hydrant defined in claim 9 wherein the bore of the stem communicates with atmosphere and wherein the plug member blocks communication of the bore with atmosphere when the plug member abuts the second plug seat.

11. The hydrant defined in claim 10 wherein the plug member is generally spherically shaped.

12. The hydrant defined in claim 10 wherein the plug member includes a slide adapted to abut the second plug seat in sealing engagement.

13. The hydrant defined in claim 12 wherein the plug member further includes a seal seat adapted to abut the one plug seat in sealing engagement.

14. The hydrant defined in claim 13 wherein the seal seat defines an annular ring with an opening therethrough and wherein the slide is generally cylindrical and positioned in the opening in sliding and sealing engagement with the seal seat.

15. The hydrant defined in claim 10 wherein the stem rotates relative to the cartridge body and has a rotation limit with an exterior surface including an outwardly projecting lobe and wherein the cartridge body has a cooperating rotation chamber aligned with the rotation limit, the rotation chamber including an inwardly extending stop surface to abut the lobe and limit rotation of the stem to less than about 360 degrees relative to the cartridge body.

16. The hydrant defined in claim 15 wherein the rotation limit includes a pair of opposing outwardly projecting lobes.

17. The hydrant defined in claim 16 wherein the rotation chamber includes a pair of inwardly extending stop surfaces to abut the lobes and limit relative rotation of the stem to about 90 degrees.

18. The hydrant defined in claim 15 wherein the valve cartridge further includes a key having a keying surface engaging the conduit to prevent rotation of the valve cartridge relative to the conduit.

19. The hydrant defined in claim 18 wherein the key includes a non-cylindrical exterior portion of the valve cartridge.

20. The hydrant defined in claim 19 wherein the conduit is crimped about the key of the valve cartridge.

21. The hydrant defined in claim 18 wherein the conduit includes a seat adapter with a cooperating socket adapted to receive the key.

22. The hydrant defined in claim 21 wherein the key is a tab extending from one of the first cartridge end and a second cartridge end and wherein the socket is a slot.

23. The hydrant defined in claim 18 wherein the valve cartridge further includes a retainer adapted to couple with the cartridge body at one of the first cartridge end and a second cartridge end, the retainer having an annular surface abutting the valve and a first stop surface, the cartridge body having a cooperating second stop surface abutting the first stop surface and positively locating the annular surface relative to the cartridge body.

24. The hydrant defined in claim 23 wherein the valve is a ceramic disk stack comprising a fixed disk positioned in and fixed in rotational position relative to the cartridge body, a rotating disk abutting the fixed disk in face to face relation and operatively connected with the stem, and a valve seal between the valve and one of the retainer and the cartridge body.

25. The hydrant defined in claim 23 wherein the conduit has an outer end, and the stem has a terminal end near the outer end of the conduit, and wherein the hydrant further includes an operator connected with the stem at the terminal end, to actuate the stem and manipulate the valve between the open position and the closed position.

26. The hydrant defined in claim 25 wherein the operator is a handle for manipulation by a user.

27. The hydrant defined in claim 25 wherein the operator includes a lock cylinder operatively connected with the stem and a separate key adapted to engage the lock cylinder, the lock cylinder being adapted to inhibit use of the hydrant, the key being adapted to facilitate manipulation of the hydrant by a user when the key engages the lock cylinder.

28. The hydrant defined in claim 27 wherein the lock cylinder defines a socket and the key is adapted to engage the socket.

29. The hydrant defined in claim 28 wherein the lock cylinder and the stem are adapted for engagement between the lock cylinder and the stem and for disengagement of the lock cylinder from the stem, the lock cylinder having an engaged position wherein manipulation of the lock cylinder actuates the stem and manipulates the valve between the open position and the closed position, the lock cylinder having a disengaged position wherein the stem is unaffected by manipulation of the lock cylinder.

30. The hydrant defined in claim 1 wherein the stem rotates relative to the cartridge body and has a rotation limit with an exterior surface including an outwardly projecting lobe and wherein the cartridge body has a cooperating rotation chamber aligned with the rotation limit, the rotation chamber including an inwardly extending stop surface to abut the lobe and limit rotation of the stem to less than about 360 degrees relative to the cartridge body.

31. The hydrant defined in claim 30 wherein the rotation limit includes a pair of opposing outwardly projecting lobes.

32. The hydrant defined in claim 31 wherein the rotation chamber includes a pair of inwardly extending stop surfaces to abut the lobes and limit relative rotation of the stem to about 90 degrees.

33. The hydrant defined in claim 1 wherein the valve cartridge further includes a key having a keying surface engaging the conduit to prevent rotation of the valve cartridge relative to the conduit.

34. The hydrant defined in claim 33 wherein the key includes a non-cylindrical exterior portion of the valve cartridge.

35. The hydrant defined in claim 34 wherein the conduit is crimped about the key of the valve cartridge.

36. The hydrant defined in claim 34 wherein the conduit includes a seat adapter with a cooperating socket adapted to receive the key.

37. The hydrant defined in claim 36 wherein the key is a tab extending from one of the first cartridge end and a second cartridge end and wherein the socket is a slot.

38. The hydrant defined in claim 1 wherein the valve cartridge further includes a retainer adapted to couple with the cartridge body at one of the first cartridge end and a second cartridge end, the retainer having an annular surface abutting the valve and a first stop surface, the cartridge body having a cooperating second stop surface abutting the first stop surface and positively locating the annular surface relative to the cartridge body.

39. The hydrant defined in claim 38 wherein the valve is a ceramic disk stack comprising a fixed disk positioned in and fixed in rotational position relative to the cartridge body, a rotating disk abutting the fixed disk in face to face relation and operatively connected with the stem, and a valve seal between the valve and one of the retainer and the cartridge body.

40. The hydrant defined in claim 1 wherein the conduit has an outer end, and the stem has a terminal end near the outer end of the conduit, and wherein the hydrant further includes an operator connected with the stem at the terminal end, to actuate the stem and manipulate the valve between the open position and the closed position.

41. The hydrant defined in claim 40 wherein the operator is a handle for manipulation by a user.

42. The hydrant defined in claim 40 wherein the operator includes a lock cylinder operatively connected with the stem and a separate key adapted to engage the lock cylinder, the lock cylinder being adapted to inhibit use of the hydrant, the key being adapted to facilitate manipulation of the hydrant by a user when the key engages the lock cylinder.

43. The hydrant defined in claim 42 wherein the lock cylinder defines a socket and the key is adapted to engage the socket.

44. The hydrant defined in claim 43 wherein the lock cylinder and the stem are adapted for engagement between the lock cylinder and the stem and for disengagement of the lock cylinder from the stem, the lock cylinder having an engaged position wherein manipulation of the lock cylinder actuates the stem and manipulates the valve between the open position and the closed position, the lock cylinder having a disengaged position wherein the stem is unaffected by manipulation of the lock cylinder.

45. A hydrant comprising:
a conduit adapted to communicate with a fluid source and a spout;
a ceramic disk valve mounted in the conduit, the valve being movable between an open position allowing fluid flow axially through the valve in a first direction from the fluid source toward the spout and a closed position blocking fluid flow;
a hollow actuator stem connected with the valve for manipulating the valve between the open position and the closed position, the stem is in fluid communication with the valve and the conduit to define a fluid passage through the stem, valve and conduit;
the stem having a chamber forming part of the fluid passage and means to direct all fluid flow axially from the valve through the chamber;
the stem further having a transverse opening for communication between the chamber and the spout;
the stem further having a coaxial bore for communication between the chamber and atmosphere; and
a check valve positioned within the chamber, to permit fluid flow in a direction opposite the first direction, and to control communication between the chamber and atmosphere.

46. The hydrant defined in claim 45 wherein the check valve includes one plug seat and a cooperating plug member, the one plug seat and the plug member being adapted to abut in sealing engagement with one another, the one plug seat being positioned between the plug member and the fluid source.

47. The hydrant defined in claim 46 wherein the check valve further includes a second plug seat, adapted to abut in sealing engagement with the plug member and positioned in the bore of the stem, on a side of the plug member opposite the one plug seat.

48. The hydrant defined in claim 47 wherein the bore of the stem communicates with atmosphere and wherein the plug member blocks communication of the bore with atmosphere when the plug member abuts the second plug seat.

49. The hydrant defined in claim 48 wherein the plug member is generally spherically shaped.

50. The hydrant defined in claim 48 wherein the plug member includes a slide adapted to abut the second plug seat in sealing engagement.

51. The hydrant defined in claim 50 wherein the plug member further includes a seal seat adapted to abut the one plug seat in sealing engagement.

52. The hydrant defined in claim 51 wherein the seal seat defines an annular ring with an opening therethrough and wherein the slide is generally cylindrical and positioned in the opening in sliding and sealing engagement with the seal seat.

53. A hydrant comprising:
a conduit adapted to communicate with a fluid source;
a valve cartridge positioned in the conduit, the valve cartridge including a cartridge body having first and second opposite open ends, a ceramic disk valve mounted in the cartridge body, the valve being movable between an open position allowing fluid flow axially through the valve in a first direction from the second open end through the first open end and a closed position blocking fluid flow, a hollow actuator stem connected with the valve for manipulating the valve between the open position and the closed position, the stem extending away from the cartridge body, and in fluid communication with the first open end of the cartridge body and the conduit to define a fluid passage through the cartridge body, the valve, the stem and the conduit, the stem being rotatable relative to the cartridge body and having a rotation limit with an exterior surface including an outwardly projecting lobe, the cartridge body having a cooperating rotation chamber aligned with the rotation limit lobe, the rotation chamber including an inwardly extending stop surface to abut the lobe and limit rotation of the stem to less than about 360 degrees relative to the cartridge body; and a seal in the fluid passage between the valve cartridge and the conduit to block fluid flow between the valve cartridge and the conduit in a direction opposite the first direction.

54. The hydrant defined in claim 53 wherein the rotation limit includes a pair of opposing outwardly projecting lobes.

55. The hydrant defined in claim 54 wherein the rotation chamber includes a pair of inwardly extending stop surfaces to abut the lobes and limit relative rotation of the stem to about 90 degrees.

56. A hydrant comprising:

a conduit adapted to communicate with a fluid source;

a valve cartridge positioned in the conduit, the valve cartridge including a cartridge body having first and second opposite open ends, a ceramic disk valve mounted in the cartridge body, the valve being movable between an open position allowing fluid flow axially through the valve in a first direction from the second open end through the first open end and a closed position blocking fluid flow, a hollow actuator stem connected with the valve for manipulating the valve between the open position and the closed position, the stem extending away from the cartridge body, and a retainer adapted to couple with the cartridge body, the retainer having an annular surface abutting the valve and a first stop surface, the cartridge body having a cooperating second stop surface abutting the first stop surface and positively locating the annular surface relative to the cartridge body, and the cartridge body in fluid communication with the retainer and the conduit to define a fluid passage through the stem, the cartridge body, the valve, the retainer and the conduit; and a seal in the fluid passage between the valve cartridge and the conduit to block fluid flow between the valve cartridge and the conduit in a direction opposite the first direction.

57. The hydrant defined in claim 56 wherein the valve is a ceramic disk stack comprising a fixed disk positioned in and fixed in rotational position relative to the cartridge body, a rotating disk abutting the fixed disk in face to face relation and operatively connected with the stem, and a valve seal between the valve and one of the retainer and the cartridge body.

58. The hydrant defined in claim 57 further including a check valve operatively connected with the cartridge body to permit fluid flow from the fluid source and comprising the seal to block fluid flow in a reverse direction toward the fluid source.

59. The hydrant defined in claim 58 wherein the check valve includes one plug seat and a cooperating plug member, the one plug seat and the plug member being adapted to abut in sealing engagement with one another, the one plug seat being positioned between the plug member and the fluid source.

60. The hydrant defined in claim 59 wherein the conduit includes a seat adapter and the seat adapter defines the one plug seat.

61. The hydrant defined in claim 60 wherein the plug member is operatively connected at a first cartridge end, in sliding engagement relative to the one plug seat and in proximity to the one plug seat to abut the one plug seat in sealing engagement blocking fluid flow in the reverse direction and to slide to a position spaced from the one plug seat permitting fluid flow from the fluid source.

62. The hydrant defined in claim 61 wherein the check valve further includes a biasing member biasing the plug member toward the one plug seat.

* * * * *